United States Patent [19]

Solomon et al.

[11] Patent Number: 5,058,152

[45] Date of Patent: Oct. 15, 1991

[54] ANONYMOUS INTERACTIVE TELEPHONE SYSTEM HAVING DIRECT CONNECT FEATURE

[75] Inventors: Merrill Solomon, Washington, D.C.; John Kimball, Germantown, Md.

[73] Assignee: The Telephone Connection, Washington, D.C.

[21] Appl. No.: 448,110

[22] Filed: Dec. 12, 1989

[51] Int. Cl.⁵ .................. H04M 1/64; H04M 1/66; H04M 3/50

[52] U.S. Cl. .................. 379/67; 379/196; 379/211; 379/212; 379/213

[58] Field of Search .............. 379/88, 67, 213, 214, 379/233, 212, 211, 188, 196, 197, 199, 79, 82, 84

[56] References Cited

U.S. PATENT DOCUMENTS

| | | | |
|---|---|---|---|
| 2,957,047 | 10/1960 | Wennemer | 379/211 |
| 3,410,598 | 10/1965 | Ballin et al. | 379/74 |
| 3,614,328 | 10/1971 | McNaughton et al. | 379/211 X |
| 3,626,109 | 12/1971 | Bartlett et al. | 379/197 |
| 3,704,346 | 11/1972 | Smith et al. | 379/157 |
| 3,959,600 | 5/1976 | Sousa | 379/157 |
| 4,313,035 | 1/1982 | Jordan et al. | 379/207 |
| 4,371,752 | 2/1983 | Matthews et al. | 379/89 |
| 4,577,062 | 3/1986 | Hilleary et al. | 379/88 |
| 4,611,094 | 9/1986 | Asmuth et al. | 379/89 |
| 4,629,831 | 12/1986 | Curtin et al. | 379/213 |
| 4,634,811 | 1/1987 | Curtin et al. | 379/211 |
| 4,696,028 | 9/1987 | Morganstein et al. | 379/88 |
| 4,757,267 | 7/1988 | Riskin | 379/113 |
| 4,783,796 | 11/1988 | Ladd | 379/67 |
| 4,785,473 | 11/1988 | Pfeiffer et al. | 379/89 |
| 4,809,321 | 2/1989 | Morganstein et al. | 379/211 |
| 4,893,328 | 1/1990 | Peacock | 379/67 |

FOREIGN PATENT DOCUMENTS

| | | |
|---|---|---|
| 3027176 | 2/1982 | Fed. Rep. of Germany. |
| 56-156058 | 12/1981 | Japan ............... 379/79 |
| 58-96447 | 6/1983 | Japan ............... 379/211 |
| 59-52954 | 3/1984 | Japan ............... 379/211 |
| 61-142848 | 6/1986 | Japan ............... 379/211 |

OTHER PUBLICATIONS

Bell Communications Research Exchange, vol. 3; Issue 3, May/Jun. 1987; Intelligent Network/2: A flexible framework for exchange services, Patrick Miller; pp. 9–13.

Primary Examiner—Thomas W. Brown
Attorney, Agent, or Firm—Fleit, Jacobson, Cohn, Price, Holman & Stern

[57] ABSTRACT

A method and apparatus for establishing telephone communications between anonymous service subscribers and responding callers over public telephone lines employing the Direct Inward Dialing (DID) feature to enable complete confidentiality and mutual anonymity between a caller and a subscriber and to effect immediate connecting to a subscriber without touch tone or verbal input. The system also is used as an unpublished telephone number service to enable a caller to place a message that is relayed to a subscriber. The subscriber, based on the caller's message, then can return the call to communicate with the caller. Further, the system may be used to enable a subscribing caller to place calls to persons having caller identification telephone equipment capable of identifying the telephone numbers of callers.

41 Claims, 10 Drawing Sheets

ANONYMOUS INTERACTIVE TELEPHONE SYSTEM HAVING DIRECT CONNECT FEATURE

RELATED APPLICATIONS

This application relates to U.S. patent application Ser. No. 197,028, now U.S. Pat. No. 4,878,239, which is a continuation-in-part of U.S. patent application Ser. No. 083,645, filed on Aug. 10, 1987, now U.S. Pat. No. 4,847,890.

BACKGROUND OF THE INVENTION

The present invention relates, in one aspect, to a method and a system for placing and responding to published advertisements by employing anonymous connection between a caller, and a subscriber who has placed the advertisement, by employing Direct Inward Dialing (DID) services to expedite such anonymous connection. In another aspect, the present invention relates to a method and a system for enabling limited and automated contact with those having unpublished telephone numbers, such as and for example enabling facilitated and automated contact with individuals who do not wish that their telephone numbers be published, and with groups such as physicians "on-call". In yet another aspect, the present invention relates to a system and method for maintaining anonymity of a person calling another even if the receiving party has a service (sometimes called automatic number identification, i.e., ANI, or caller ID) which provides the originating telephone number to the receiving party.

Briefly, the aforementioned '890 patent discloses a telephone system "personals" service whereby "personals" ads are placed and published as previously known. A person reading an ad, the caller, and interested in establishing a personal relationship with the person who placed the ad, the subscriber, calls a telephone number published in the "personals" column. The number called is that of a central computer based system, and the caller is prompted to enter the subscriber's reference number (SRN) furnished in the ad and unique to the subscriber. The computer then uses the subscriber reference number as an index to locate the subscriber's telephone number, and automatically connects the caller to the subscriber. Only the computer is aware of the identity of the subscriber and the subscriber's telephone number, and hence the parties can communicate with one another while being mutually anonymous for as long as they desire.

The full text and teachings of the '890 patent are incorporated herein by reference.

In the aforementioned '239 patent, certain cost-saving refinements were made using available features of the public telephone company (in particular, a service sometimes called the "Centrex" phone service) to connect a caller to a subscriber. Briefly, the caller is placed on hold at the telephone company's central office switching equipment and, concurrently, the subscriber's telephone number is located in the interactive system's memory. The subscriber is then called and also put on hold at the central office switching equipment. Finally, by hook flashing or some other means, the interactive system makes a connection between the caller and the subscriber at the telephone company's central office switching equipment, and disconnects the system from the line that originally was occupied by the caller, thus making the line available for the next incoming call. Utilizing this technique, the total number of lines required by the interactive system to provide adequate service to all callers and subscribers is minimized, for the system needs only enough lines to simultaneously process a peak number of calls that are expected at the same time, without having to consider the unknown and uncontrollable length of time that a caller and a subscriber may want to talk to one another.

Similarly, the full text and teachings of the aforementioned '239 patent are incorporated herein by reference.

While the aforementioned '890 patent provides many features never before available in a standard classified advertisement system, and while the aforementioned '239 patent has improved the efficiency of such a system, there is still a need to simplify the system to minimize voice prompting and to speed the procedure of anonymous connection.

SUMMARY OF THE INVENTION

The present invention relates to an efficient interactive telephone system in which, in one embodiment, mutually anonymous parties may conduct telephone communication with each other, without delay, and with minimal intervening steps, and maintain such anonymous communication for as long as they desire. In other embodiments, the present invention relates to an interactive telephone system of similar function, but wherein contact is made possible without the need to divulge the telephone number of the person to whom a call is placed or the telephone number of the person originating the call.

In accordance with the present invention, as an example, "personals" ads are placed and published as described above, except that rather than publishing the telephone number of the system and a subscriber reference number (SRN) unique to the subscriber, a telephone number unique to each subscriber is published. The caller interested in establishing contact with the subscriber calls the published telephone number in the subscriber's advertisement, which is a "system" telephone number rather than (but directly corresponding to) the subscriber's actual telephone number. In this manner, anonymous direct contact can be made without the need for prompting and the entry of an SRN.

Specifically, according to the first embodiment, the system of this invention utilizes what is sometimes termed Direct Inward Dialing (DID) which is provided by various Regional Bell Operating Companies or private telephone companies, and enables many telephone numbers to be associated with a single trunk line. The DID number is passed to the system to allow direct connection with a subscriber without requiring the caller to verbally or by touch-tone, enter the reference number of a subscriber.

Consequently, each subscriber's telephone number is assigned by the system to a specific DID number which is the subscriber reference number. When a call is received at the system from a caller, the system receives this DID number and the computer indexes the subscriber's published telephone number to the actual telephone number of the subscriber stored at the system controller, and automatically, without prompting the caller to enter any reference number, dials the subscriber's actual telephone number to connect the caller with the subscriber.

If the subscriber to whom a call is placed is not available, or does not wish to answer the telephone, or if the subscriber's line is busy, or generally if the system is set up for receiving calls without making direct "live" voice contact with a subscriber, the system offers the caller the ability to leave a message for the subscriber. The caller is not, however, required to reveal his or her identity or telephone number to the subscriber (just so long as it is revealed to the service) in order to enable the subscriber to call back.

It is, therefore, an object of the present invention to provide an advertising system, such as a "personals" service, that offers the users the possibility of preserving anonymity, and the capability of rapidly exchanging personal thoughts in a manner that efficiently minimizes the need for prompting the caller once connection with the system is made.

In a second embodiment, a service for contacting persons with unpublished telephone numbers is provided. Some individuals who have unpublished telephone numbers desire to be contacted under certain limited circumstances. By virtue of the present invention, those individuals may subscribe to a service by supplying their unpublished telephone number to the service, and publishing a service telephone number (DID number) that is indexed to the unpublished telephone number of the subscriber. The calling party then may be connected to a recorder and leave a message for the subscriber, or may be privy to a special code to enable the calling party to be forwarded immediately to the subscriber if available. Then, either with or without the caller still on the line, the system calls the subscriber's unpublished telephone number and plays the recorded message, allowing the subscriber to decide whether to take the call or return the call. If the caller remains on the line, he or she is placed on hold at the system controller. If the subscriber so desires, the call is placed through. Otherwise, the caller is notified by a recorded message that the subscriber is not presently available to be contacted. If the subscriber is not available when contact is attempted, periodic additional attempts are made by the system to have the caller's recorded message delivered over the telephone to the subscriber. Also, the subscriber may at any time call into the system and receive messages.

One specific application of this latter service is for doctors with unpublished home telephone numbers. The doctor supplies his/her home telephone number to the service, and patients are given the service telephone number. In this manner, a patient may call the known (published) service telephone number and contact the doctor by recording as described above.

According to a third embodiment, anonymity for any person calling another person can be maintained even if the receiving party has the service (ANI or caller ID) to obtain the originating number. There thus can be subscribers who can call those equipped with ANI or caller ID features and remain anonymous. This is accomplished by having the caller call the service (for example through a DID line), and then have the service make the ultimate call; hence the number of the service is displayed on the ANI or caller ID equipment. The calling party uses the system according to the present invention to act as an intervening party so that the caller's own telephone number is kept private.

The above and other objects and advantages will become apparent when reference is made to the following description taken in conjunction with the accompanying drawings.

DETAILED DESCRIPTION OF THE DRAWINGS

For purposes of disclosure, the present invention will be described as an interactive telephone system of the "personals" type. It should be understood, however, that the system finds use in other advertising environments.

Figure 1:
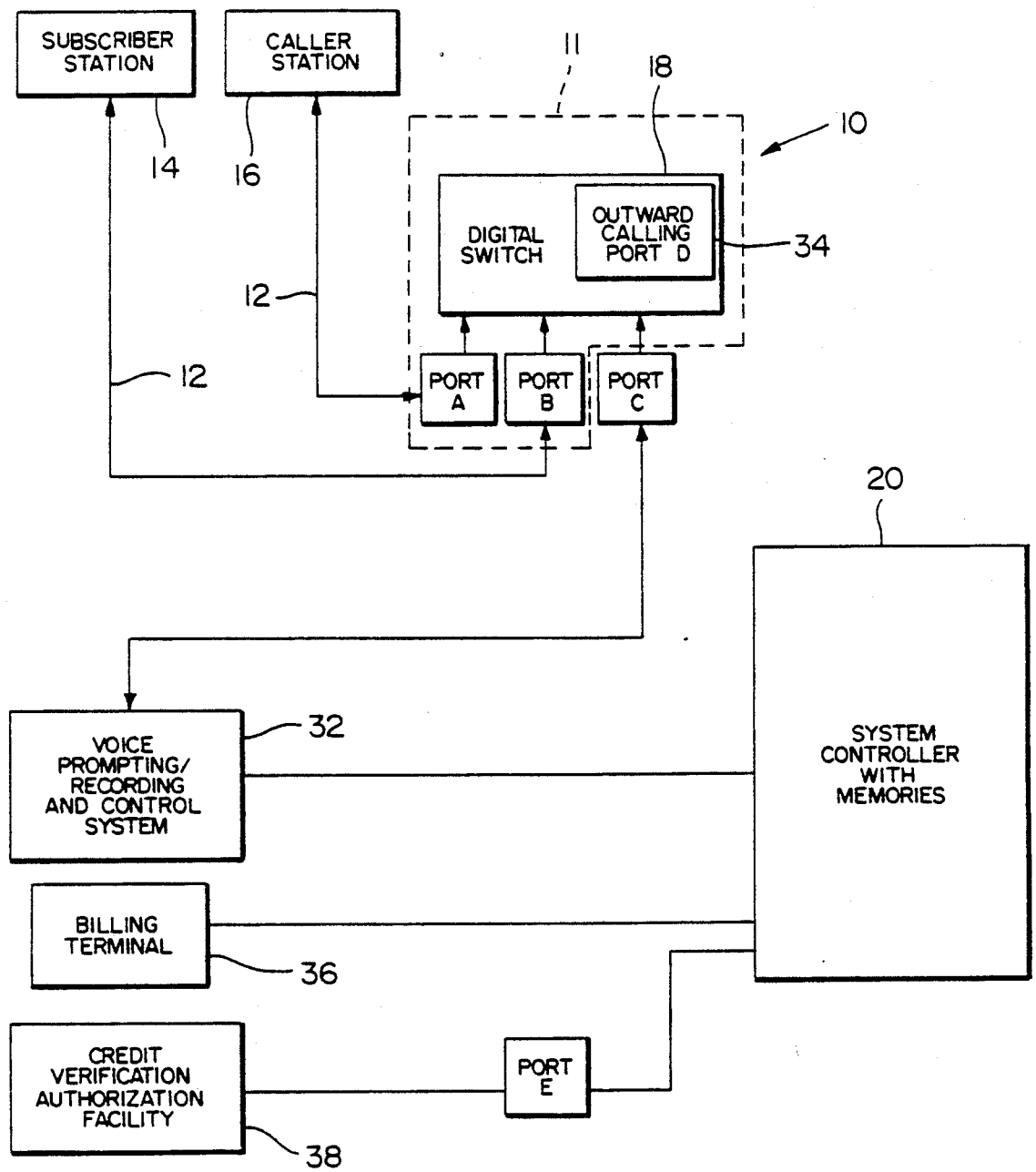
FIG. 1 is a block diagram illustrating the anonymous interactive telephone system according to the present invention.

Referring first to FIG. 1, the anonymous interactive telephone system is generally shown at 10. A detailed description of the basic operation of this system is not made here as such a description may be found in either the aforementioned '890 patent or the '239 patent. Generally, though, the interactive telephone system 10 involves the interlinking through the public telephone service (enclosed by dotted lines and referred to by reference number 11) of a subscriber to the "personals" service and an interested party (the caller). The subscriber has a telephone at a subscriber station 14, and the caller has a telephone at a caller station 16. The caller and subscriber may contact each other through computer control by software in the system controller 20 of the voice prompting/recording and control system 32. The parties located at the respective stations 14 and 16 are mutually anonymous, but both are aware of the telephone number of the "personals" service through which communication with complete confidentiality is assured, all of which will be explained in detail hereinafter. The details of the billing terminal 36, credit authorization facility 38, and all other various details may be found in either the '890 and '239 patent or patent application.

Through public telephone lines 12 and the public telephone service 11, a caller at a station 16 can reach an incoming trunk line of the system 10 at caller port A. This is accomplished by calling a telephone number published in the "personals" column. Similarly, the subscriber at station 14 can reach an incoming trunk line of the system 10 at subscriber port B, identified preferably by a second telephone number known only to the subscribers of the "personals" service.

Figure 2:
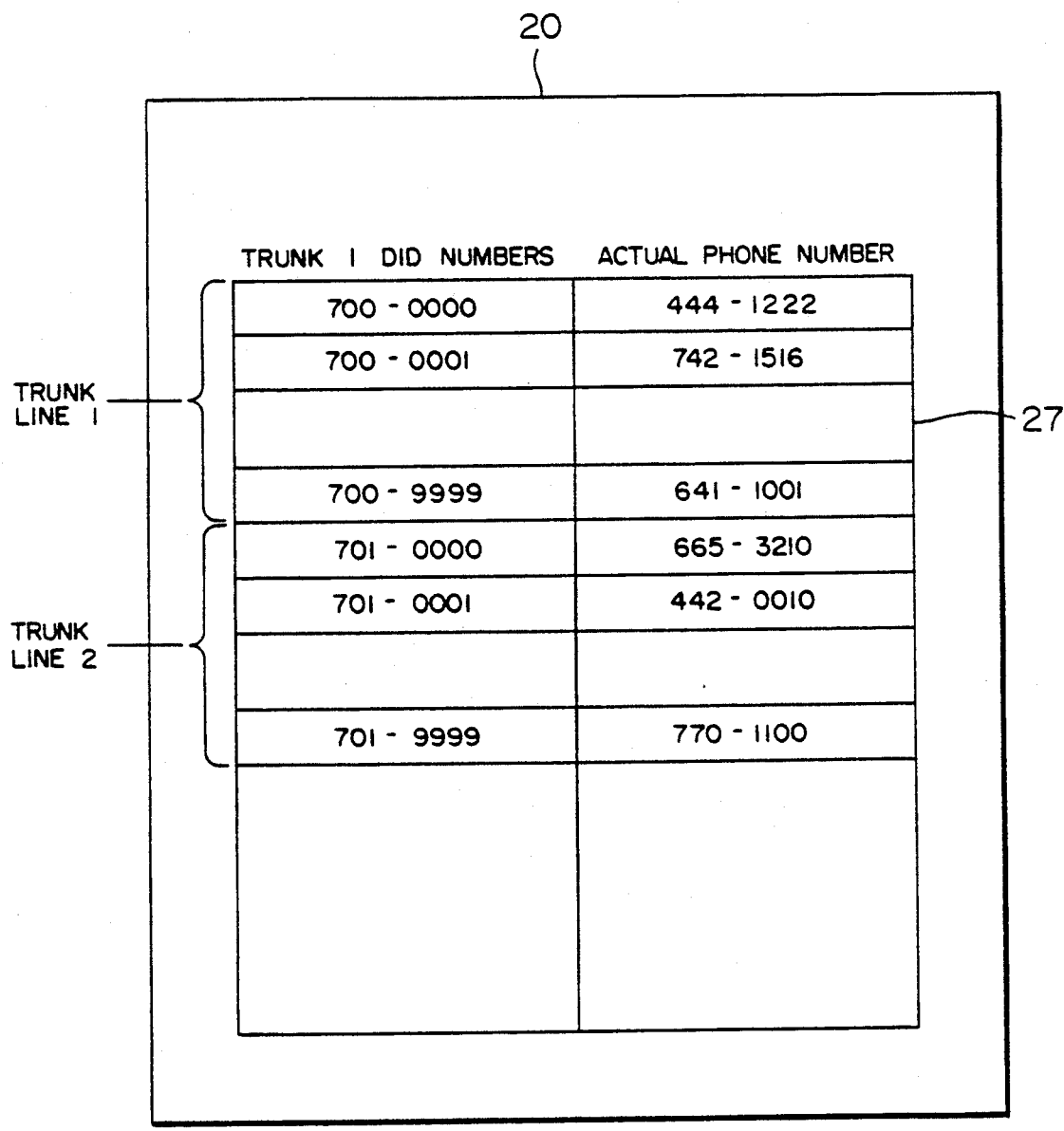
FIG. 2 is a block diagram illustrating the improvement of the present invention by the memory contents of the system controller illustrated in FIG. 1.

Referring to FIG. 2, the improvement to the anonymous interactive telephone system 10 is shown at system controller 20 which includes an updatable read/- write memory 27 that indexes a published subscriber reference number to the actual telephone number of the subscriber. Each subscriber using the system is assigned a seven digit subscriber reference number including a three digit exchange number and a four digit line number. These numbers, when dialed, connect a caller to the system controller station which acts according to the particular telephone number dialed to reach the system controller station. The system 10 includes access to a plurality of trunk lines, each of which has a plurality of DID numbers associated with it. For example, as shown in FIG. 2, trunk line 1 has DID numbers 0000 through 9999 associated with it. This feature is provided by the Region Bell Operating Companies. More importantly, when a caller dials, for example, 700-0001, the system 10, through the voice prompting/recording and control system 32, receives the last four digits of the number dialed. In this case, the number 0001 will be received. Using these four digits and the three digit exchange number, the system indexes into the memory 27 and finds the associated actual phone number of the subscriber. The system finds that the actual telephone number corresponding to this number is 742-1516. The system may then call this number to allow communication between a caller and a subscriber. Therefore, by receiving the call from the caller, together with the called subscriber published reference number (embedded in the telephone number), the system controller, without verbal or other prompted interaction with the caller, automatically indexes the call to the corresponding subscriber and looks up a private subscriber telephone number from a public reference number without asking the caller for the subscriber reference number.

As a more detailed example, suppose a caller reads an advertisement and desires to call subscriber having an actual telephone number of 665-3200; the published telephone number for this subscriber is 700-0050 which is the reference number for this subscriber. The caller then calls this number (700-0050) either with a Touch-Tone or rotary dial phone, and reaches the system 10. The three digit trunk exchange "700" and the last four digits "0050" are made available to the system to allow a search through the memory to find the uniquely corresponding actual telephone number of this subscriber.

As subscribers remove and place advertisements, the memory 27 is updated. In this manner, if a caller attempts to reach an inactive subscriber, the system controller 20 is capable of announcing an appropriate message to the caller via the voice prompting/recording and control system 32.

By employing the DID feature, the processing capability of the system is greatly expanded and expedited. There is no need to verbally prompt the caller to enter a subscriber reference number, this being accomplished inherently by the telephone number used to reach the system. And yet other features, for example enabling the subscriber to call into the system, to receive recorded messages, etc., still can be employed. Such additional features are described in detail in the aforementioned '890 patent.

There are several ways in which the last four digits of the telephone number dialed to reach the system are passed to the system. One way is by an Integrated Services Digital Network (ISDN). Another is by an alternate signalling means such as dual tone multiple frequency (DTMF), multiple frequency (MF), or digital signalling means.

In addition, the connection between the caller and subscriber can be effected in one of two ways. First, the system can seize a trunk line and dial the actual telephone number of the subscriber and connect the caller and subscriber. Second, and in the preferred embodiment, the system can use the Centrex feature which is described in the aforementioned '239 patent. By this method, the caller is put on hold at the switching station, and the same line is used to dial the actual telephone number of the subscriber. Thus, if the subscriber is available, the static connection between the caller and subscriber is maintained by the switching station of the public telephone company.

Figure 3:
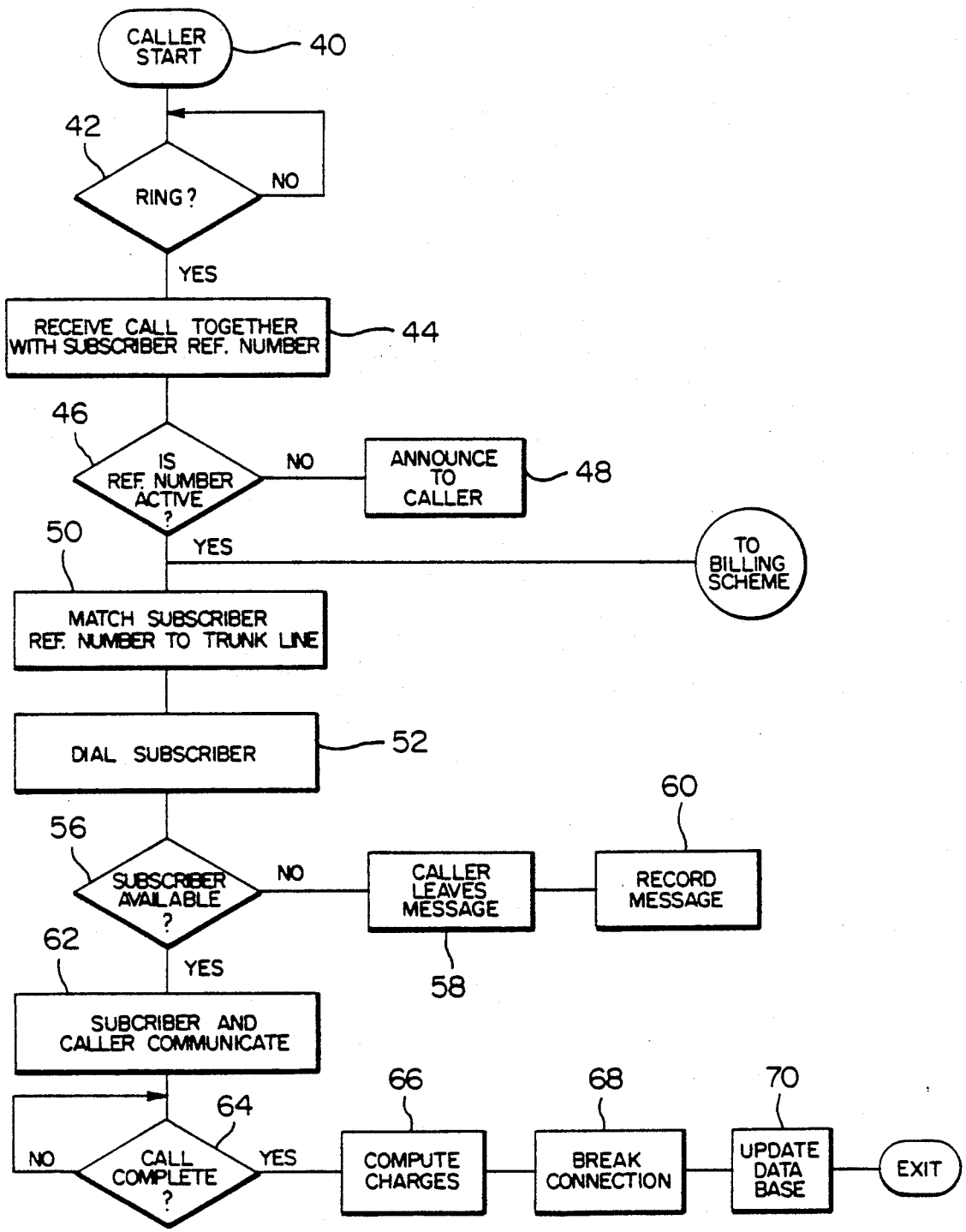
FIG. 3 is a flow chart diagram illustrating in greater detail the interfacing program corresponding to the improvement illustrated in FIG. 2.

With reference now to FIG. 3, taken in conjunction with FIG. 2, a detailed description of the operation of system will be given. The caller initiates the process by calling the system at step 40. Connection into the system is achieved through one of the trunk lines at step 42. The call is then received at step 44 together with the subscriber published reference number 16, via the DID feature. At step 46, it is determined whether this number is active. (Both the system and the subscriber can make the reference number inactive.) If the reference number is not active, a message is announced to the caller at step 48. Otherwise, the process continues.

If the subscriber reference number is active, the system may then obtain billing information for billing purposes (as described in the aforementioned '890 patent) or immediately attempt to connect the caller with the desired subscriber. This decision is made by the system programmer. After the billing routine is complete, the process returns to step 50 where the subscriber reference number is matched to the actual telephone number of the subscriber and this number is dialed at step 52. If the subscriber's line is busy, or not answered, at step 56, the caller may leave a message at step 58 which is recorded at step 60. Otherwise, the caller and subscriber are connected, to enable communication therebetween at step 62. A more detailed description of the message recording procedure is provided hereinafter in conjunction with FIG. 9.

Once the subscriber and caller are finished conversing, at step 64 if the system is not the Centrex based system, the charges are computed at step 66. The connection between the subscriber and caller is then broken at step 68. Finally, the database is updated at step 70 for billing and other purposes as described in the aforementioned '890 patent.

Figure 4:
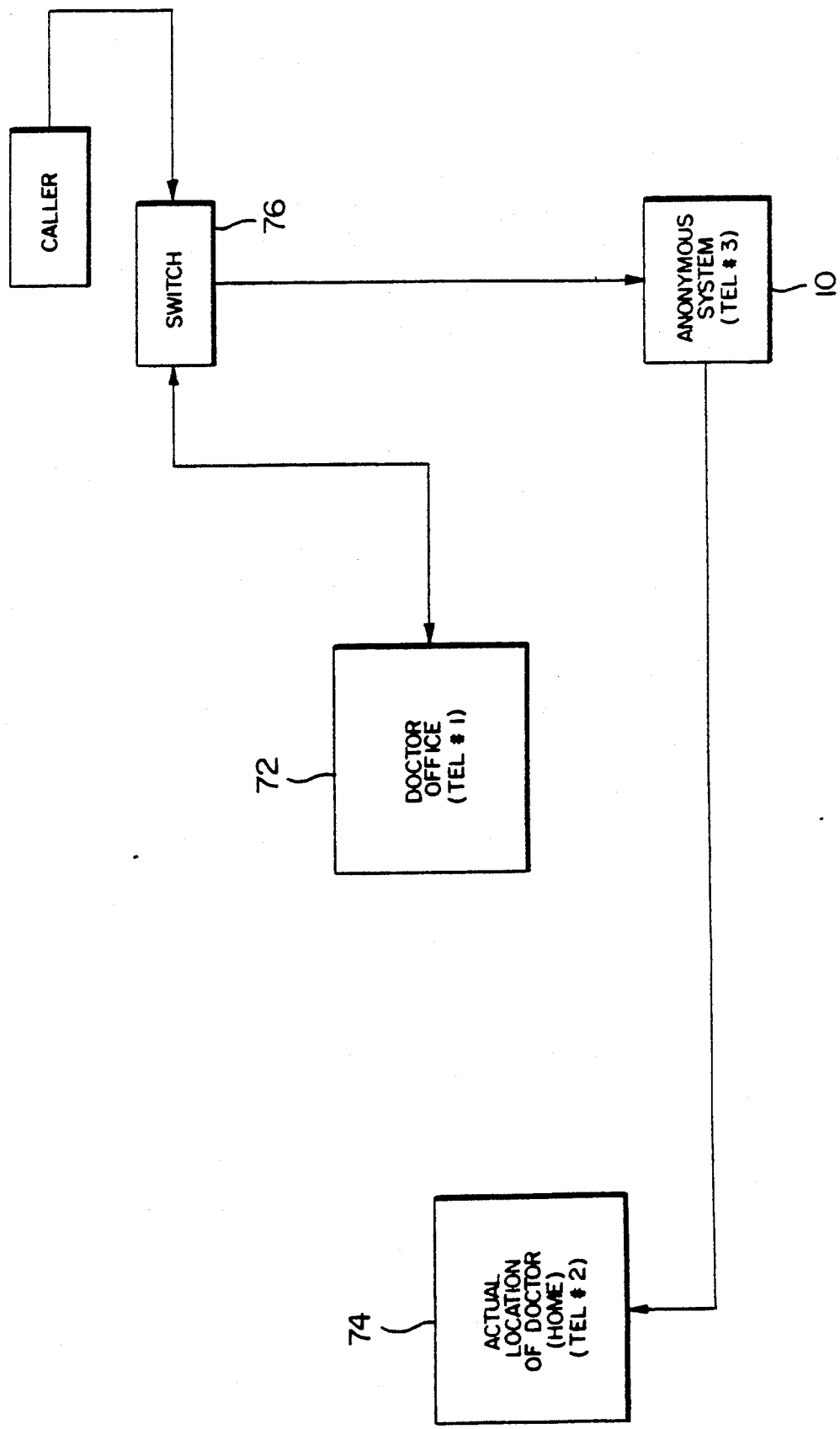
FIG. 4 is a block diagram illustrating an example of the second embodiment of the present invention.
Figure 5:
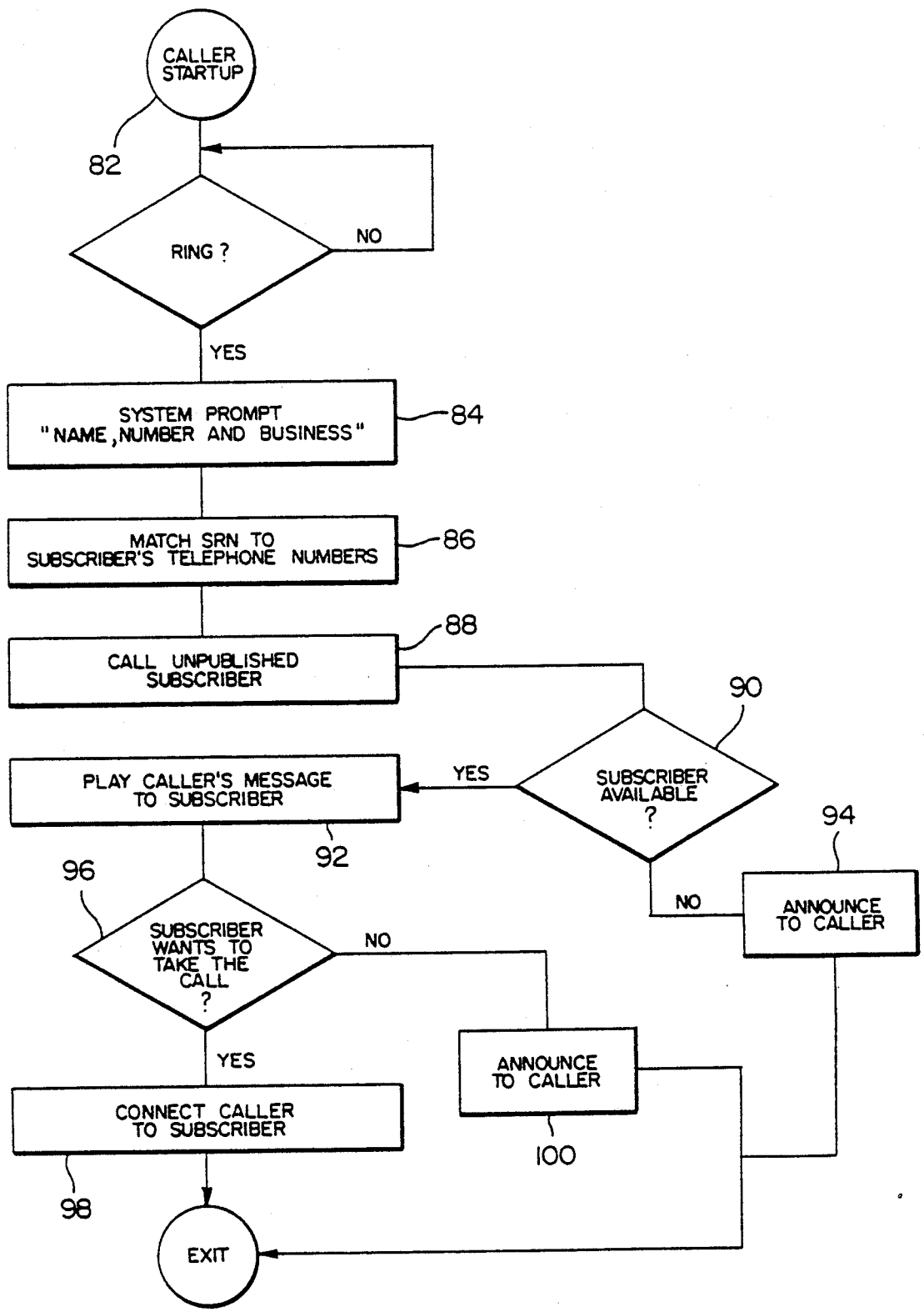
FIGS. 5 and 6 are flow chart diagrams illustrating an unpublished telephone number service according to the second embodiment of the present invention.
Figure 6:
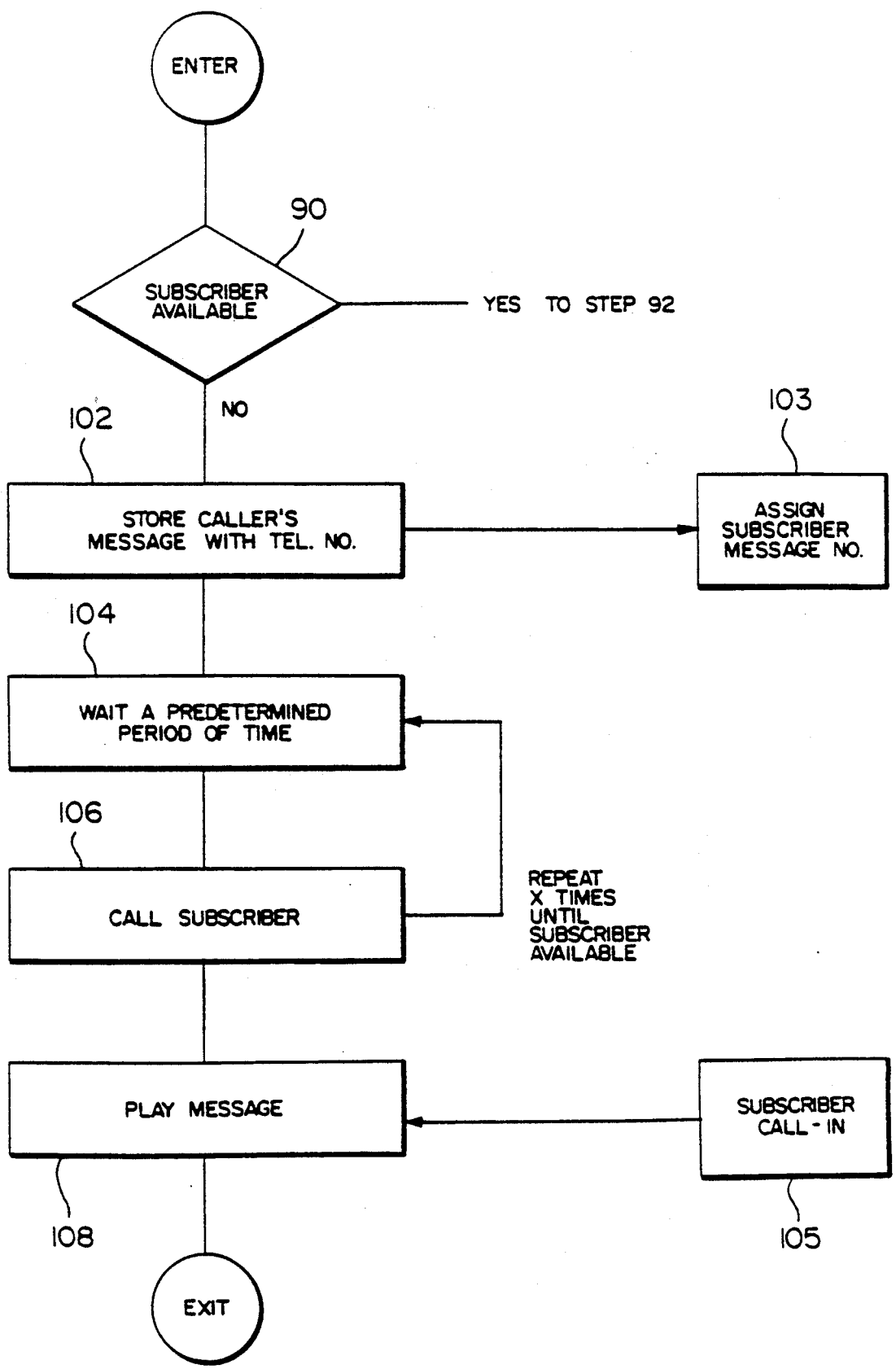

Turning now to FIGS. 4–6, the second embodiment of the present invention will be described. The anonymous interactive telephone system 10 can be slightly modified in its software to perform a connecting service for persons with unpublished telephone numbers. Subscribers who have unpublished numbers, but want to be contacted, may subscribe to the system of the present invention, which provides an automated call screening function for the subscriber.

One example of the unpublished telephone number service is shown in FIG. 4. A doctor acting as a subscriber having an office 72 and home 74, supplies his/her unpublished number of the home 74 to the system. Patients are given the number of the system by the doctor, or if the doctor has call forwarding, the switch 76 (part of the public telephone system) switches the call from the office, to the system 10. (In this manner, the patient needs to know only one number for 24-hour access to the subscribing doctor.) This is programmed by the doctor. A patient desiring to contact the doctor who calls the doctor's office (or directly to the system) is directed to the system and announces his name, the purpose of his call, and his telephone number. The system by indexing the DID telephone number called by the patient to the doctor, calls the doctor to play the patient's message. The doctor therefore immediately receives the patient's message, without actually speaking to the patient, and can then call the patient when appropriate. On the other hand, if the doctor is not available to take the call, the system can call the requested doctor through an alternate telephone number, or can call the next doctor "on call", etc., until a doctor is reached.

FIG. 5 illustrates the details of the second embodiment. The caller who desires to contact a subscriber with an unpublished telephone number, contacts the system at step 82 either directly or via a call forwarding feature. The caller is then prompted to state his name, telephone number, the purpose for his call at step 84. The voice prompting/recording and control system 32 records this message. The subscriber's reference number (embedded in the called telephone number) is recognized, and the subscriber's corresponding and actual telephone number is found in memory. Alternatively, the caller may announce the subscriber reference number in step 84 which is recognized by word recognition technique. This is accomplished at step 86. Then, the subscriber's telephone number is called at step 88 and if the subscriber is available, as determined at step 90 at which the subscriber may be requested to enter a verification code, the caller's recorded message is played to the subscriber at step 92. Otherwise, a message announcing to the caller that the subscriber is unavailable is issued at step 94.

After the subscriber hears the caller's message, he then decides whether or not to take the call at step 96. If he so chooses (as by responding to a voice message through telephone tone), the system connects the subscriber to the caller at step 98. The caller who is put on hold by the Centrex service of the telephone company is then connected with the subscriber. Otherwise, at step 100, a message is announced to the caller saying that the subscriber is not available to communicate with the caller.

As shown in FIG. 6, if the subscriber is not available when contact is attempted, the caller's message, including the caller's telephone number announced by the caller, is recorded. The message may be stored under a subscriber message number at step 103 which the subscriber uses to retrieve his message at step 105. The subscriber may periodically call in to the system as shown at step 105 to check for messages which are indexed and in a subscriber message database as described in the aforementioned '890 patent. In addition, the system may periodically call the subscriber, or try in priority several alternative subscriber numbers, until the recorded message is played to the subscriber. This might be necessary since persons with unpublished numbers do not typically know or suspect when somebody would try to contact them. Thus, as shown in FIG. 6, the caller's message is stored at step 102 and after the initial contact attempt, and a predetermined period of time indicated by step 104, the subscriber is called by the system at step 106. If the subscriber is available, the caller's message together with an introduction prompt is played to the subscriber at step 108. Steps 104–106 are repeated until the subscriber is finally reached.

Figure 7:
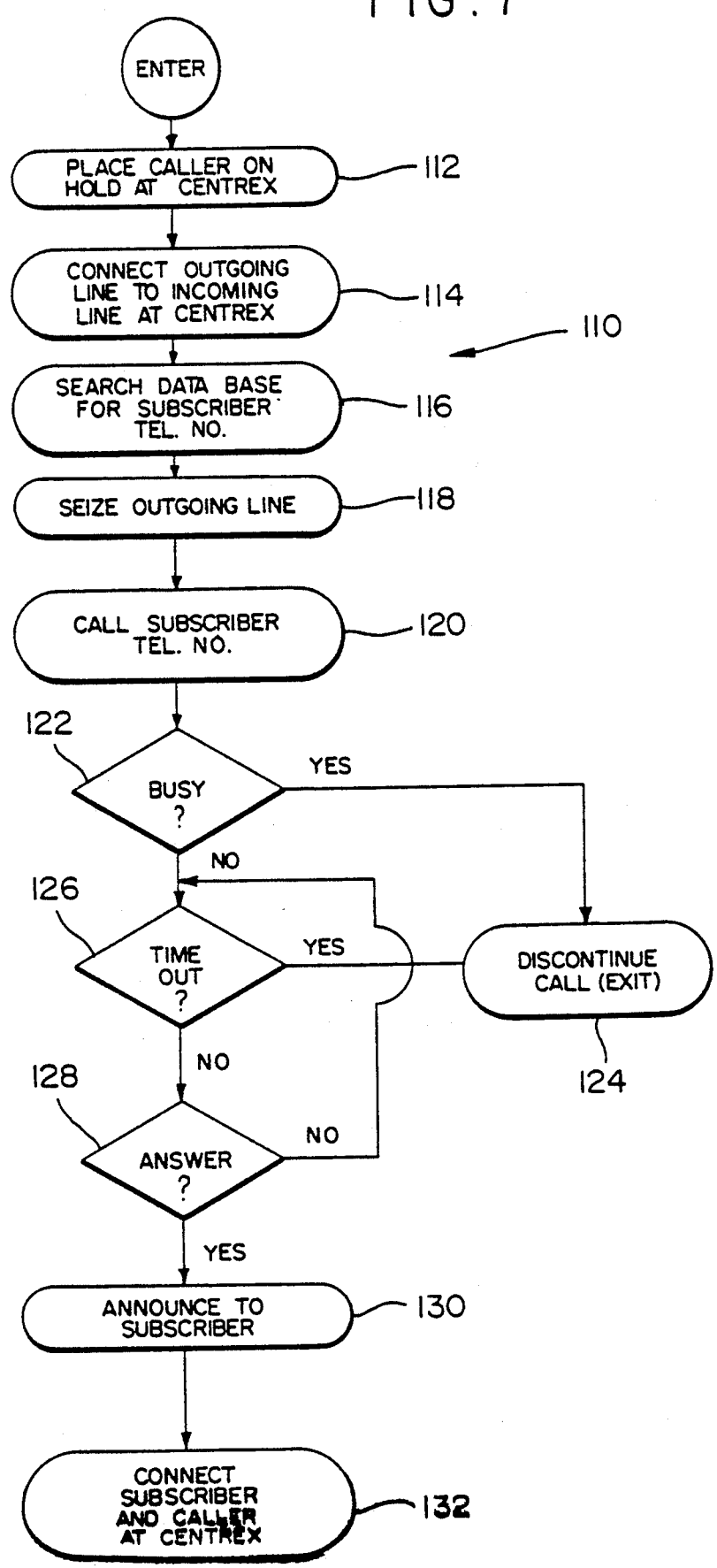
FIG. 7 is a flow diagram of the Centrex feature as it applies to the present invention.

FIG. 7 illustrates in detail the program 110 associated with the "Centrex" call transferring operation which is preferably used in both the first and second embodiments. After it is determined which subscriber is to be contacted, the voice prompting/recording system 32 asks the caller to hold, and hook flashes the incoming line of the caller to place the call on hold at the phone company's central office at step 112. The central office also connects an outgoing line to the voice prompting/recording and control system 32 and signals this connection by providing a dial tone at step 114. Concurrently, a search of the database at 92 is made for the subscriber's telephone number corresponding to the subscriber information. The system then uses the line at step 118 to call the subscriber in step 120. If, in step 122, the subscriber's line is busy, the routine is exited via step 124, disconnecting from the call and connecting back to the caller. Otherwise, a predetermined amount of time for the subscriber to answer the call is provided in steps 126 and 128. If the call is not answered within this allotted time period the routine is exited via step 124, disconnecting from the subscriber and connecting back to the caller. Otherwise, the call is answered and the subscriber and caller are connected by hook flashing the line at step 132 (or as in the second embodiment the caller's recorded message is played to the answering subscriber in step 130). The system 10 then is removed from the loop and the phone company's central switching equipment maintains the connection between the caller and subscriber. Thus, the system 10 has freed this line for the next incoming call.

Figure 8:
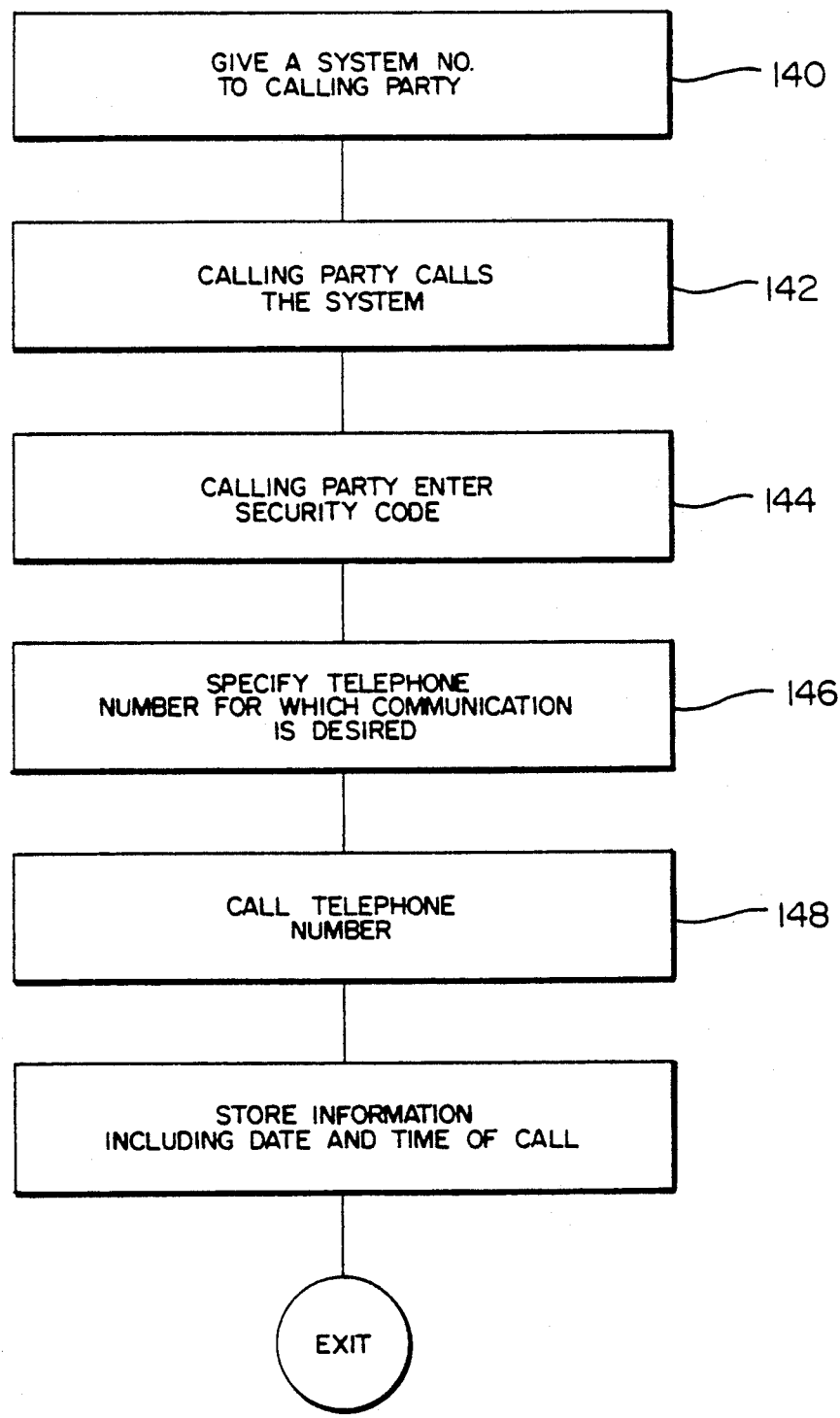
FIG. 8 is a flow diagram of the third embodiment of the present invention.

FIG. 8 illustrates a third embodiment of the present invention which preserves anonymity of outgoing calls of a calling party to a receiving party. Each calling party is given a telephone number of the system at step 140, which may or may not be a DID number. The calling party also is given a security code. The calling party calls the system at step 142 and enters his/her security code at step 144. Although not specifically shown as such, if the security code is invalid, the process terminates. Otherwise, the telephone number for which the calling party wishes to communicate is specified at step 146 by allowing the calling party to enter the actual telephone number or a speed dialing option of the person with whom he/she wishes to communicate. Thereafter, the number is called at step 148. As the call is being processed, the system stores information including the number dialled, date and time the call is made.

By this arrangement, the calling party maintains his/her anonymity even if the receiving party has a service such as that provided by ANI or caller ID by which the originating number is made available to the receiver of the call. As such, the telephone number of the system controller station may be revealed to the receiving party if that party has the caller ID service. However, should a person receive any threatening or obscene phone calls, the system has information of the time, date and originator of the call so that proper action by the law enforcement authorities can be taken.

Figure 9:
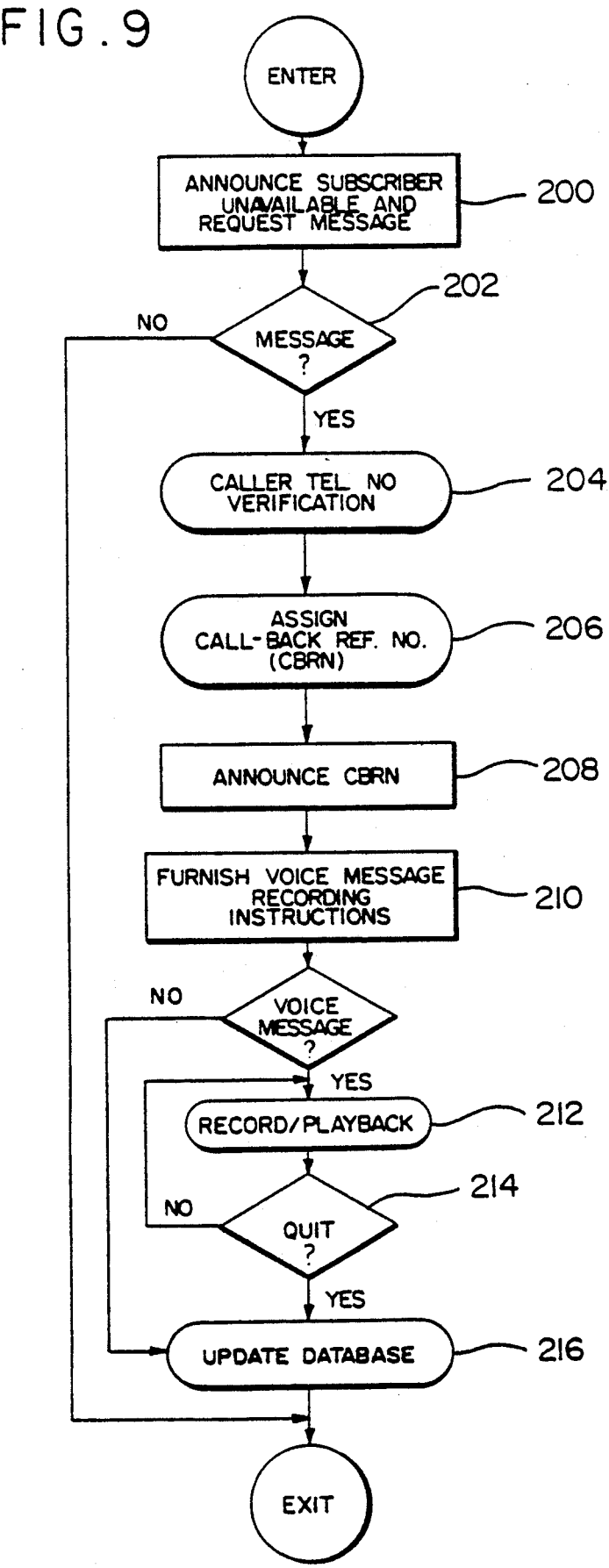
FIGS. 9 and 10 are flow chart diagrams illustrating in greater detail portions of the interfacing programs associated with the interactive telephone system of the present invention.

FIG. 9 illustrates the program for the message recording mode of operation. This program is used in system 10 and in the unpublished telephone number service to allow a caller to leave a message. Such operational mode, which permits total anonymity, if desired, is initiated with an announcement from the voice prompting/recording and control system 32 to the caller that the subscriber is unavailable and a message can be left as indicated by reference number 200. If no message is desired, the program terminates and the call is disconnected. On the other hand, if the caller wishes to leave a message, as indicated at decision 202, the caller telephone number is requested and then verified by a verification operation as indicated by reference number 204. A call-back reference number is assigned as indicated at 206 and is indexed to the caller's telephone number. Additionally, the caller information is indexed to the particular subscriber to whom the call was placed. The assigned call-back reference number is announced to the caller as indicated at 208, followed by the furnishing of voice message recording instructions as indicated at 210. A recording and playback operation 212 then ensues. The caller is then given the option, as indicated at 214, of either accepting or rejecting the recorded message. If the recorded message is rejected, another record/playback session occurs. Once the caller hangs up at the end of the record/playback session, the message recording mode is terminated and the database is updated as indicated at 216. If the caller does not require anonymity, he or she may, in the recording or playback operation 212, provide his or her name, telephone number, etc., for the subscriber.

Figure 10:
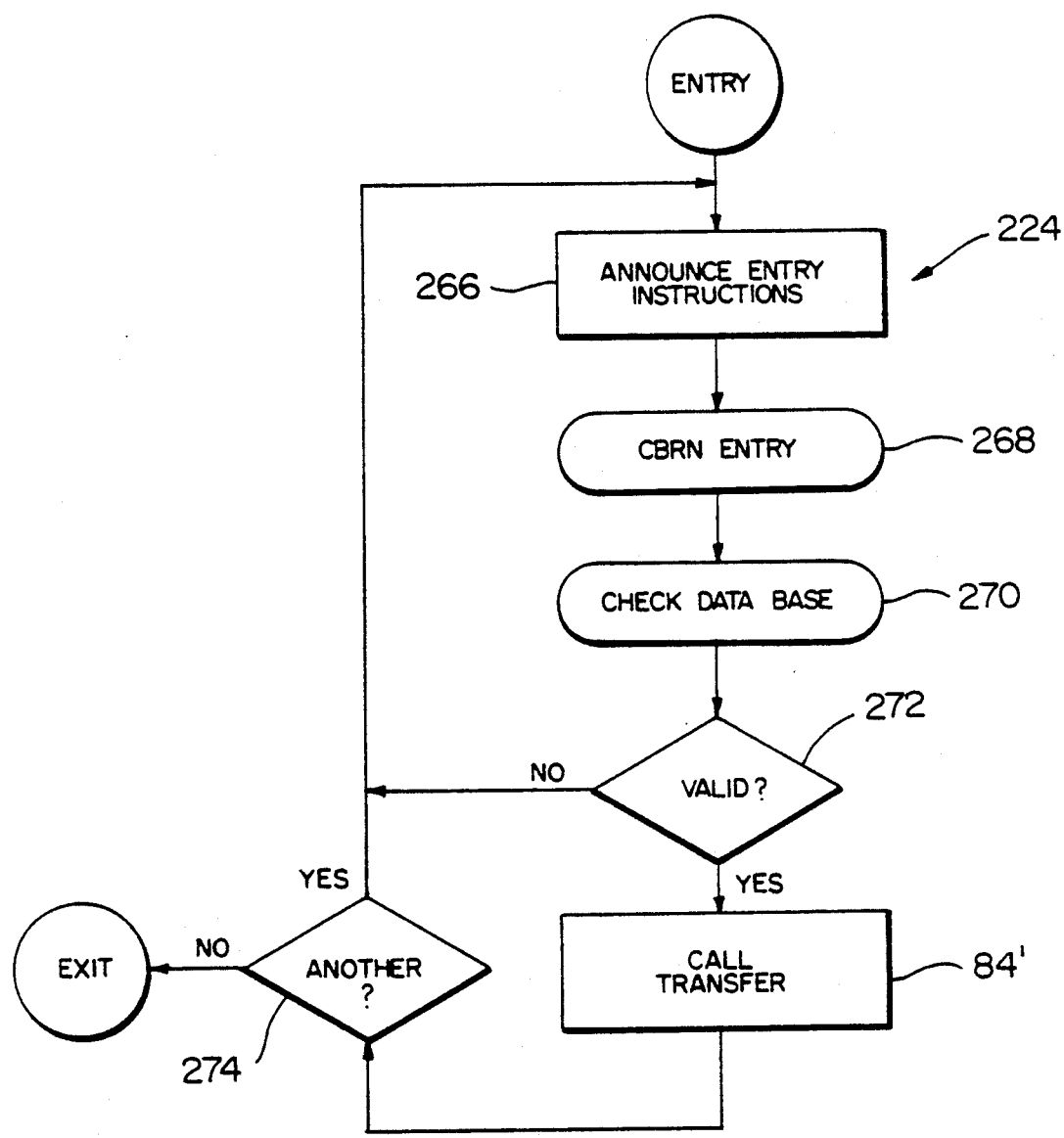

Subroutine 224 for a subscriber to return the call of a caller is illustrated in greater detail in FIG. 10. This program is initiated by speech prompting announcement to the subscriber providing instructions for entry of information as indicated by reference number 266. The subscriber then enters a desired call-back reference number as indicated at 268 followed by a database check 270. If the call-back reference number entered by the subscriber is valid as indicated at 272, the telephone call from the subscriber is directed to the desired caller's station in accordance with a call transferring routine 84'.

Features such as the subscriber interfacing program, service selection, message statistics, and customer message service also can be used in the first and second embodiment of the present invention, and are fully described in the aforementioned '890 patent. Furthermore, information from the caller can be received by the system to enable the caller to become a subscriber. In this regard, specific reference is made to column 10, line 56 to column 11, line 4 of U.S. Pat. No. 4,847,890. Specific reference is also made to column 7, line 2 to column 8, line 12 in connection with the subscriber interfacing program.

The above description is provided for illustrative purposes, and is not intended to limit the present invention in any way except as set forth in the following claims.

What is claimed is:

1. A telephone communication method for anonymously enabling a subscriber at a subscriber station to communicate with a caller at a caller station, said method allowing said caller to communicate with said subscriber without said caller knowing the identity of the subscriber prior to establishing communication with said subscriber, but knowing a particular subscriber with whom communication is desired, and allowing the identity of the particular subscriber and the caller to be kept anonymous during communication between said particular subscriber and said caller unless voluntarily revealed by either said particular subscriber or said caller, said method including the steps of:
   storing data at a system controller station that is received from a plurality of subscribers at a plurality of subscriber stations, such data including the telephone number of each of said subscriber stations and a corresponding reference number for each of said subscriber stations;
   publishing the telephone number of said system controller station and said reference numbers for each of said subscriber stations;
   receiving a call from a caller station to said system controller station and a particular reference number corresponding to said particular subscriber at a particular subscriber station included within said published telephone number;
   matching said particular reference number with the corresponding telephone number of said particular subscriber station; and
   automatically routing said call received from said caller station at said system controller station to said particular subscriber station by calling said telephone number of said particular subscriber station.

2. The method of claim 1, and further including the step of storing call transferring instructions at said system controller station as programmed by each said subscriber at said subscriber station.

3. The method of claim 1, and further comprising the step of recording a message from said caller station if said particular subscriber of said particular subscriber station is unavailable to receive a call.

4. The method of claim 1, wherein data received from a caller station is stored at the system controller station, such data including the telephone number of the caller station.

5. The method of claim 1, and further comprising the step of receiving data from a caller station such as to enable the caller station to become a subscriber station.

6. The method of claim 1, and further comprising the step of recording a message from said caller station prior to connecting said caller station to said subscriber station.

7. A method of enabling anonymous communication between a caller and a subscriber over public telephone lines, said method allowing said caller to communicate with said subscriber without said caller knowing the identity of the subscriber prior to establishing communication with said subscriber, but knowing a particular subscriber with whom communication is desired, and allowing the identity of the particular subscriber and the caller to be kept anonymous during communication between said particular subscriber and said caller unless voluntarily revealed by either said particular subscriber or said caller, said method comprising the steps of:
   providing a published telephone number of a system controller;
   storing in said system controller telephone numbers of a plurality of subscribers and subscriber reference number corresponding to the telephone number of each subscriber;
   publishing an advertisement for each subscriber including the subscriber reference number together with the telephone number of said system controller;
   receiving a call from a caller at said system controller through the means of said published telephone number of said system controller and a particular reference number of a particular subscriber at a particular subscriber station included with said published telephone number; and
   routing the call from said caller to said particular subscriber by indexing the received subscriber reference number to the corresponding telephone number of said particular subscriber station and calling said telephone number of said particular subscriber station.

8. A method of enabling communication between a caller and a subscriber over public telephone lines, said method allowing said caller to communicate with said subscriber without said caller knowing the identity of the subscriber prior to establishing communication with said subscriber, but knowing a particular subscriber with whom communication is desired, and allowing the identity of the particular subscriber and the caller to be kept anonymous during communication between said particular subscriber and said caller unless voluntarily revealed by either said particular subscriber or said caller, said method comprising the steps of:
 publishing a telephone number of a system controller station;
 storing telephone numbers of subscribers and indexing said telephone numbers to corresponding published subscriber identifiers, each of said published subscriber identifiers being a part of and embedded in the telephone number of said system controller station;
 receiving a call at said system controller station through the means of said published telephone number; and
 transferring the call to a particular subscriber by indexing a received particular published subscriber identifier corresponding to said particular subscriber to the telephone number of said particular subscriber and calling said telephone number of said particular subscriber.

9. The method of claim 8, and further comprising the step of recording a message from said caller in communication with said system controller station if said particular subscriber is unavailable to receive a call.

10. The method of claim 9, and further including the step of enabling said particular subscriber to review the recorded message.

11. The method of claim 8, and further comprising the step of recording a message from said caller in communication with said system controller station prior to transferring the call to said particular subscriber.

12. A network for anonymously connecting a caller to a subscriber over public telephone lines, the network comprising:
 system controller means having a plurality of published telephone numbers, each such number including an embedded subscriber reference number of a particular subscriber;
 memory means for indexing said subscriber reference numbers to telephone numbers of corresponding subscribers;
 means for communicating with said system controller means by way of said published telephone numbers;
 means for transferring a call from a caller station received at said system controller means to a particular subscriber station upon receiving one of said published telephone numbers together with an embedded particular subscriber reference number corresponding to said particular subscriber, matching said particular subscriber reference number to the corresponding telephone number of said particular subscriber and connecting the call from said caller station by calling the telephone number of said particular subscriber so that the identity of said particular subscriber at said particular subscriber station can be unknown to a caller at said caller station prior to establishing communication between said caller and said particular subscriber, and the identity of said particular subscriber and said caller being kept anonymous during communication between said particular subscriber and said caller unless voluntarily revealed by either said particular subscriber or said caller.

13. The network of claim 12, and further comprising means for recording a message from said caller upon the unavailability of said particular subscriber, said message including a call-back reference number;
 means for storing a telephone number of said caller station and indexing said telephone number to said call-back reference number;
 means for playing back said message to said particular subscriber; and
 means for enabling anonymous communication between said particular subscriber and said caller on the basis of said call-back reference number of said caller station.

14. The network of claim 12, and further comprising means for recording a message from said caller so that such recorded message can be played back to said particular subscriber.

15. A telephone communication method for anonymously connecting a subscriber having an unpublished telephone number with a caller, said method including the steps of:
 storing data at a system controller station that is received from a plurality of subscribers at a plurality of subscriber stations, such data including the telephone number of each subscriber station;
 publishing the telephone number of said system controller station in advertisements;
 receiving a call from a caller at a caller station to said system controller station, and receiving identifier information for identifying a particular subscriber at a particular subscriber station for which communication is desired;
 recording a message from said caller, said message including information such as name, purpose for the call, and the telephone number of said caller;
 matching said identifier information with the telephone number of said particular subscriber at said particular subscriber station;
 calling said particular subscriber at said particular subscriber station;
 playing said recorded message to said particular subscriber; and
 connecting said caller to said particular subscriber upon authorization of said particular subscriber.

16. The method of claim 15, wherein said subscriber identifier information is audible voice information.

17. The method of claim 15, wherein said subscriber identifier information is a subscriber reference number.

18. The method of claim 15, and further comprising the step of verifying the presence of said particular subscriber at said particular subscriber station prior to playing said recorded message and connecting said caller to said particular subscriber by requesting a verification code from said particular subscriber.

19. A telephone communication network for providing a service for connecting callers to subscribers having unpublished telephone numbers, said network comprising:

system controller means having a published telephone number;

memory means for storing unpublished telephone numbers of said subscribers and identifier information corresponding to said unpublished telephone numbers;

indexing means for indexing said unpublished telephone numbers to the corresponding identifier information;

means for communicating with said system controller means by way of said published telephone number;

prompting/recording means for recording a message from a caller, said message including particular identifier information for a particular subscriber and prompting the caller to supply to the network at least the telephone number of said caller;

means for calling said particular subscriber based on said particular identifier information and playing said message to said particular subscriber, if available; and means for connecting said caller and said particular subscriber upon the authorization of said particular subscriber.

20. The network of claim 19, and further comprising means for periodically calling said particular subscriber until said subscriber is available to receive said message.

21. The network of claim 19, and further comprising:

means for storing the telephone number supplied by said caller and indexing the telephone number of said caller to a call-back reference number;

means for playing back said message to said particular subscriber and announcing said call-back reference number to said particular subscriber; and means for enabling anonymous communication between said particular subscriber and said caller on the basis of said call-back reference number of said caller.

22. The network of claim 19, and further comprising means for calling and playing back said message to a secondary subscriber related to said particular subscriber, if said particular subscriber is not available to receive said message.

23. A telephone communication method for anonymously connecting a subscriber having an unpublished telephone number with a caller via public telephone lines controlled by a public telephone company having a central switching station with the capability of connecting together select ones of the public telephone lines, the method including the steps of:

storing data at a system controller station that is received from a plurality of subscribers at subscriber stations, such data including the telephone number of each subscriber station;

publishing the telephone number of said system controller station in advertisements;

receiving a call from a caller at a caller station to said system controller station and identifier information for identifying a particular subscriber at a particular subscriber station with whom communication is desired;

recording a message from said caller, said message including information such as name, purpose for the call, and the telephone number of said caller;

matching said identifier information with the telephone number of said particular subscriber at said particular subscriber station;

calling said particular subscriber at said particular subscriber station;

playing said recorded message to said particular subscriber;

connecting said caller to said particular subscriber upon authorization of said particular subscriber, said connecting being accomplished at said public telephone company central switching station, under control of said system controller station; and disconnecting said system controller station from the caller station, the particular subscriber station, and the public telephone company central switching station, so that after said caller station and said particular subscriber station are connected together on their respective telephone lines, said public telephone company central switching station maintains the connection between the caller and the particular subscriber.

24. The method of claim 23, wherein said identifier information comprises a subscriber reference number, said step of publishing comprises the step of embedding a subscriber reference number in the telephone number of said system controller station, said subscriber reference number being received by said system controller station upon receiving the call from the caller station.

25. The method of claim 23, wherein said identifier information comprises audible voice.

26. The method of claim 23, wherein said identifier information comprises audible voice.

27. A telephone communication method for anonymously connecting a subscriber station and a caller station via public telephone lines controlled by a public telephone company central switching station having the capability of connecting together select ones of public telephone lines, the method including the steps of:

storing data at a system controller station that is received from a plurality of subscribers at a plurality of subscriber stations, such data including the telephone number of each of said subscriber stations and a corresponding reference number for each subscriber station;

publishing the telephone number of said system controller station and said reference numbers for each of said subscriber stations;

receiving a call from a caller station to said system controller station and particular reference number corresponding to said particular subscriber at a particular subscriber station included within said published telephone number;

matching said particular reference number with the corresponding telephone number of said particular subscriber station; and automatically connecting the telephone call received from said caller station at the system controller station to said particular subscriber station, said connecting being accomplished at said public telephone company central switching station, under the control of said system controller station; and disconnecting said system controller station from the caller station, the particular subscriber station, and the public telephone company central switching station, so that after said caller station and said particular subscriber station are connected together on their respective public telephone lines, the public telephone company central switching station maintains the connection between the caller station and particular subscriber station.

28. A telephone communication method for anonymously enabling a subscriber at a subscriber station to communicate with a caller at a caller station, said method allowing said caller to communicate with said subscriber without said caller knowing the identity of the subscriber prior to establishing communication with said subscriber, but knowing a particular subscriber with whom communication is desired, and allowing the identity of the particular subscriber and the caller to be kept anonymous during communication between said particular subscriber and said caller unless voluntarily revealed by either said particular subscriber or said caller, said method including the steps of:

storing data at a system controller station that is received from a plurality of subscribers at a plurality of subscriber stations, such data including the telephone number of each of said subscriber stations and a corresponding reference number for each of said subscriber stations;

publishing the telephone number of said system controller station and said reference numbers for each of said subscriber stations;

receiving a call from a caller station to said system controller station and a particular reference number corresponding to said particular subscriber at a particular subscriber station included within said published telephone number;

matching said particular reference number with the corresponding telephone number of said particular subscriber station; and automatically transferring said call received from said caller station at said system controller station to said particular subscriber station if said particular reference number is an active and valid number by calling said telephone number of said particular subscriber station.

29. The method of claim 28, wherein each subscriber is capable of making inactive his/her corresponding reference number.

30. A method of enabling anonymous communication between a caller and a subscriber over public telephone lines, said method allowing said caller to communicate with said subscriber without said caller knowing the identity of the subscriber prior to establishing communication with said subscriber, but knowing a particular subscriber with whom communication is desired, and allowing the identity of the particular subscriber and the caller to be kept anonymous during communication between said particular subscriber and said caller unless voluntarily revealed by either said particular subscriber or said caller, said method comprising the steps of:

providing a published telephone number of a system controller;

storing in said system controller telephone numbers of a plurality of subscribers and a subscriber reference number corresponding to the telephone number of each subscriber;

publishing an advertisement for each subscriber including the subscriber reference number together with the telephone number of said system controller;

receiving a call from a caller at said system controller through the means of said published telephone number of said system controller and a particular reference number of a particular subscriber at a particular subscriber station included with said published telephone number;

routing the call from said caller to said particular subscriber if the particular subscriber is available by indexing the received subscriber reference number to the corresponding telephone number of said particular subscriber station and calling said telephone number of said particular subscriber station;

recording a message and a call-back reference number if said particular subscriber is unavailable;

providing the message and said call-back reference number to said particular subscriber; and enabling communication of said particular subscriber with said caller upon the subscriber providing the call-back reference number of said caller.

31. A telephone communication method for anonymously connecting a subscriber having an unpublished telephone number with a caller, said method including the steps of:

storing data at a system controller station that is received from a plurality of subscribers at a plurality of subscriber stations, such data including the telephone number of each subscriber station;

publishing the telephone number of said system controller station in advertisements;

receiving a call from a caller at a caller station to said system controller station, and receiving identifier information for identifying a particular subscriber at a particular subscriber station included for which communication is desired;

recording a message from said caller, said message including information such as name, purpose for the call, and the telephone number of said caller;

matching said identifier information with the telephone number of said particular subscriber at said particular subscriber station;

calling said particular subscriber at said particular subscriber station;

playing said recorded message to said particular subscriber if said particular subscriber is available;

connecting said caller to said particular subscriber upon authorization of said particular subscriber; and announcing to said caller that said particular subscriber is unavailable to communicate with the caller if the subscriber is unavailable.

32. A telephone communication method for anonymously connecting a subscriber station and a caller station via public telephone lines controlled by a public telephone company central switching station having the capability of connecting together select ones of public telephone lines, the method including the steps of:

storing data at a system controller station that is received from a plurality of subscribers at a plurality of subscriber stations, such data including the telephone number of each of said subscriber stations and a corresponding reference number for each subscriber station;

publishing the telephone number of said system controller station and said reference numbers for each of said subscriber stations;

receiving a call from a caller station to said system controller station and particular reference number corresponding to a particular subscriber at a particular subscriber station included within said published telephone number;

placing the caller station on hold at the central switching station;

matching said particular reference number with the corresponding telephone number of said particular subscriber station and calling the corresponding telephone number;

connecting the caller station to said particular subscriber station at said public telephone company central switching station; and disconnecting said system controller station from the central switching station.

33. A telephone communication method for anonymously enabling a subscriber at a subscriber station to communicate with a caller at a caller station, said method allowing said caller to communicate with said subscriber without said caller knowing the identity of the subscriber prior to establishing communication with said subscriber, but knowing a particular subscriber with whom communication is desired, and allowing the identity of the particular subscriber and the caller to be kept anonymous during communication between said particular subscriber and said caller unless voluntarily revealed by either said particular subscriber or said caller, said method including the steps of:

storing data at a system controller station that is received from a plurality of subscribers at a plurality of subscriber stations, such data including the telephone number of each of said subscriber stations and a corresponding reference number for each of said subscriber stations;

publishing the telephone number of said system controller station and said reference numbers for each of said subscriber stations;

receiving a call from a caller station to said system controller station and a particular reference number corresponding to said particular subscriber at a particular subscriber station included within said published telephone number;

matching said particular reference number with the corresponding telephone number of said particular subscriber station; and automatically transferring said call received from said caller station at said system controller station to said particular subscriber station depending upon the availability of said particular subscriber station by calling said telephone number of said particular subscriber station; and recording a message from said caller station in communication with said system controller station if said particular subscriber station is unavailable to receive a call, such recorded message including a call-back reference number of said caller station that is indexed to a stored telephone number of said caller station.

34. The method of claim 33, and further including the step of enabling a subscriber at said particular subscriber station to review said recorded message, said message including the call-back reference number but not necessarily the telephone number of said caller station.

35. The method of claim 33, wherein each subscriber at a subscriber station is provided with a personal access code to access said system controller station, and wherein each subscriber at a subscriber station calling said system controller station can be allowed to anonymously communicate with a caller at a caller station by supplying to the system controller station a call-back reference number of a caller station who is unable to be connected to a desired subscriber due to subscriber unavailability.

36. The method of claim 33, wherein said call-back reference number is generated by said system controller station.

37. A telephone communication method for anonymously connecting a subscriber having an unpublished telephone number with a caller, said method including the steps of:

storing data at a system controller station that is received from a plurality of subscribers at a plurality of subscriber stations, such data including the telephone number of each subscriber station;

publishing the telephone number of said system controller station in advertisements;

receiving a call from a caller at a caller station to said system controller station, and receiving identifier information for identifying a particular subscriber at a particular subscriber station for which communication is desired;

recording a message from said caller, said message including information such as name, purpose for the call, and the telephone number of said caller;

matching said identifier information with the telephone number of said particular subscriber at said particular subscriber station;

calling said particular subscriber at said particular subscriber station;

playing said recorded message to said particular subscriber if said particular subscriber is available; and periodically calling said particular subscriber until the particular subscriber is available and playing said message when said subscriber is available to receive said message.

38. A telephone communication method for anonymously connecting a subscriber having an unpublished telephone number with a caller, said method including the steps of:

storing data at a system controller station that is received from a plurality of subscribers at a plurality of subscriber stations, such data including the telephone number of each subscriber station;

publishing the telephone number of said system controller station in advertisements;

receiving a call from a caller at a caller station to said system controller station, and receiving identifier information for identifying a particular subscriber at a particular subscriber station included for which communication is desired;

recording a message from said caller, said message including information such as name, purpose for the call, and the telephone number of said caller;

matching said identifier information with the telephone number of said particular subscriber at said particular subscriber station;

calling said particular subscriber at said particular subscriber station;

playing said recorded message to said particular subscriber if said particular subscriber is available; and playing the recorded message to said particular subscriber who calls the system to obtain messages attempted to be conveyed to the particular subscriber when the particular subscriber was unavailable.

39. A telephone communication network for providing a service for connecting callers to subscribers having unpublished telephone numbers, said network comprising:

system controller means having a published telephone number;

memory means for storing unpublished telephone numbers of said subscribers and identifier information corresponding to said unpublished telephone numbers, said memory means indexing said unpublished telephone numbers to the corresponding identifier information;

means for communicating with said system controller means by way of said published telephone number;

prompting/recording and control means for recording a message from a caller, said message including particular identifier information for a particular subscriber and prompting the caller to supply to the network at least the telephone number of said caller, said prompting/recording and control means for calling said particular subscriber based on said particular identifier information and playing said message to said particular subscriber, if available, and for connecting said caller and said particular subscriber upon the authorization of said particular subscriber.

40. The network of claim 39, wherein said prompting/recording and control means periodically calls said particular subscriber until said subscriber is available to receive said message under control of said system controller means.

41. The network of claim 39, wherein said prompting/recording and control means records information including a call-back reference number, and stores a telephone number of said caller in said memory means which indexes the telephone number of said caller to said call-back reference number, said prompting/recording and control means plays back said message to said particular subscriber, and enables communication between said particular subscriber and said caller on the basis of said call-back reference number of said caller.

* * * * *